United States Patent
Brown

(10) Patent No.: US 10,860,586 B2
(45) Date of Patent: Dec. 8, 2020

(54) METHODS AND DEVICES FOR JOINING MULTIPLE EVENTS IN DATA STREAMING ANALYTICS SYSTEMS

(71) Applicant: Red Hat, Inc., Raleigh, NC (US)

(72) Inventor: Gary Peter Brown, Hitchin (GB)

(73) Assignee: Red Hat, Inc., Raleigh, NC (US)

( * ) Notice: Subject to any disclaimer, the term of this patent is extended or adjusted under 35 U.S.C. 154(b) by 222 days.

(21) Appl. No.: 15/899,276

(22) Filed: Feb. 19, 2018

(65) Prior Publication Data
US 2019/0258733 A1    Aug. 22, 2019

(51) Int. Cl.
*G06F 16/2453*   (2019.01)
*G06F 16/2455*   (2019.01)

(52) U.S. Cl.
CPC .... *G06F 16/24568* (2019.01); *G06F 16/2456* (2019.01); *G06F 16/24537* (2019.01); *G06F 16/24552* (2019.01)

(58) Field of Classification Search
CPC ........... G06F 16/24568; G06F 16/2456; G06F 16/24537; G06F 16/24552
See application file for complete search history.

(56) References Cited

U.S. PATENT DOCUMENTS

| | | | |
|---|---|---|---|
| 9,069,681 B1 | 6/2015 | Qiu et al. | |
| 9,535,825 B2 | 1/2017 | Asai et al. | |
| 9,818,130 B1 | 11/2017 | Radziwonczyk-Syta et al. | |
| 2006/0085592 A1* | 4/2006 | Ganguly | G06F 16/2456 711/114 |
| 2009/0287628 A1* | 11/2009 | Indeck | G06N 5/025 706/47 |
| 2011/0040887 A1 | 2/2011 | Andrade et al. | |
| 2011/0083037 A1* | 4/2011 | Bocharov | H04N 21/23116 714/4.11 |
| 2011/0131198 A1* | 6/2011 | Johnson | G06F 16/24568 707/714 |
| 2017/0053010 A1 | 2/2017 | Beyer et al. | |

OTHER PUBLICATIONS

"Hadoop & Mapreduce Tutorial | Counters, Sorting and Joins", retrieved from https://www.vskills.in/certification/tutorial/big-data/hadoop-and-mapreduce/counters-sorting-and-joins/, Jan 4, 2018, 4 pages.
Mazzucco et al., "Merging Multiple Data Streams on Common Keys over High Performance Networks," Laboratory for Advanced Computing; University of Illinois at Chicago, Jul. 2002, 12 pages.
Warski, Adam, "Kafka Streams—How Does It Fit the Stream Processing Landscape?" SoftwareMill blog, Jun. 1, 2016, 8 pages, https://softwaremill.com/kafka-streams-how-does-it-fit-stream-landscape/.

* cited by examiner

*Primary Examiner* — Jorge A Casanova
(74) *Attorney, Agent, or Firm* — Womble Bond Dickinson (US) LLP

(57) ABSTRACT

A method is provided. The method includes receiving a plurality of data streams at a computing device, processing first event data of a first data stream of the plurality of data streams in accordance with a first key, and determining whether second event data of a second data stream of the plurality of data streams is stored in a cache memory in accordance with the first key. The second event data is to be joined with the first event data. The method further includes performing a join operation of the first event data and the second event data at least partially in view of whether the second event data is stored in the cache memory.

20 Claims, 6 Drawing Sheets

METHODS AND DEVICES FOR JOINING MULTIPLE EVENTS IN DATA STREAMING ANALYTICS SYSTEMS

TECHNICAL FIELD

Aspects of the present disclosure relate to data streaming analytics systems, and more particularly, to joining multiple event data streams in data streaming analytics systems.

BACKGROUND

Many business intelligence (BI) and other operational data analytics solutions generally include real-time data analytics techniques achieved through the implementation of the data streaming. Specifically, such data streaming based data analytics solutions may include receiving data generated by a large number (e.g., hundreds or thousands) of electronic data sources (e.g., small-scale and large-scale clients, large-scale servers, sensors, monitoring devices, personal mobile devices, web services, and so forth) within a larger data analytics network. The data stream may be processed by the data analytics system serially or in parallel on, for example, an event-by-event basis over one or more time windows (e.g., specified time intervals). As may be appreciated, the information carried by the data streams may be used to produce solutions in various applications such as, for example, web analytics, predictive maintenance, fraud detection, infrastructure monitoring, on-demand pricing, inventory management, and so forth.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
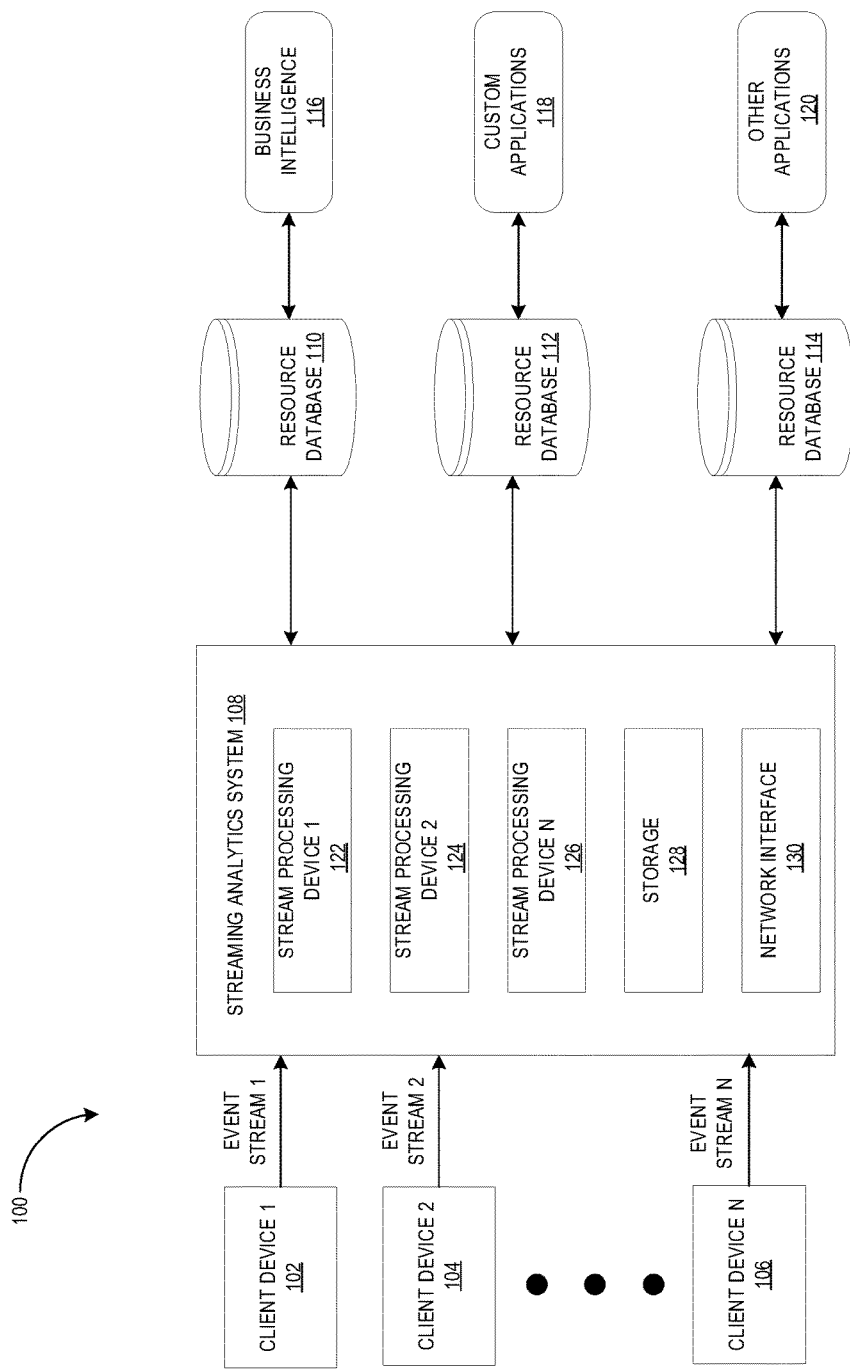
FIG. 1 is a block diagram illustrating an example analytics event processing architecture, in accordance with the present embodiments.

Certain data streaming analytics systems such as, for example, Apache Spark, Apache Storm, Apache Flink, may precipitate a number of challenges or other inefficiencies when attempting to perform join operations (e.g., coalescing and correlating of the event data streams or the coalescing and correlating of one or more data sets of the respective event data streams) of two or more event data streams. For example, as discussed above, such data streaming analytics systems may include one or more applications to define a specific time interval (e.g. a fixed time window) in which the join operation is to be completed. Specifically, such data streaming analytics systems may define the specific time interval (e.g., fixed time window) in an effort to limit the amount of data required to be held in memory where the join operation is to occur.

For example, once a first event data stream arrives at the data streaming analytics system, event data of the first event data stream is stored in memory and the fixed time window commences. Yet, if the event data of the second event data stream does not arrive at the data streaming analytics system before the fixed time window expires, and, by extension, the join operation is not completed before the fixed time interval expires, the event data of the first event data stream may be deleted from memory to preserve memory capacity. Thus, by instituting a fixed time window in which the join operation is to be completed to preserve memory capacity, such data streaming analytics systems may precipitate an inevitable trade-off between the length of time the data streaming analytics system may allow for the join operation to be performed and the memory capacity required to hold the event data of the first event data stream over the fixed time window, for example. This may lead to various inefficiencies, such as the loss of important data or the failure of certain join operations to be performed (e.g., such as when the join operation takes longer to complete than the allotted time window allows). It may be useful to provide techniques to improve the joining of multiple data streams in data streaming analytics systems.

Accordingly, in certain embodiments, as will be further appreciated below, it may be useful to provide a streaming analytics system and storage including distributed cache memory that may be used to selectively and temporarily store the data from each of the event data streams as a technique to reduce the amount of required overall memory capacity (e.g., nonvolatile memory or long-term storage) while one or more join operations are being performed. In this way, by offloading the storage of the event data of the event data streams to the cache memory (e.g., as opposed to longer-term storage databases or other nonvolatile memory) and utilizing the cache memory to perform the join operations, the present techniques may increase efficiency in performing join operations since the dependence on memory capacity (e.g., nonvolatile memory or other long-term storage) is removed.

With the foregoing in mind, it may be useful to describe a data analytics event processing architecture, such as a data analytics event processing architecture 100 as illustrated in FIG. 1. As depicted by FIG. 1, the data analytics event processing architecture 100 may include a number (e.g., hundreds or thousands) of client devices 102 (e.g., "Client Device 1"), 104 (e.g., "Client Device 2"), and 106 (e.g., "Client Device N"), a streaming analytics system 108, resource databases 110, 112, and 114, and a variety of applications such as business intelligence (BI) applications 116, custom applications 118, and other applications 120. In some embodiments, the data analytics event processing architecture 100 may include a cloud-based cluster computing architecture or other similar computing architecture useful in providing real-time or near real-time solutions with respect to various analytics and/or operations intelligence such as, for example, web analytics, predictive maintenance, fraud detection, infrastructure monitoring, on-demand pricing, inventory management, and so forth. For example, in some embodiments, the data analytics event processing architecture 100 may include a Platform as a Service (PaaS) architecture, a Software as a Service (SaaS) architecture, and an Infrastructure as a Service (IaaS), or other various cloud-based cluster computing architectures (e.g., Apache Spark, Apache Storm, Apache Flink, Apache Kafka, Apache Cassandra, Hadoop, and so forth).

In certain embodiments, the client devices 102 (e.g., "Client Device 1"), 104 (e.g., "Client Device 2"), and 106 (e.g., "Client Device N") may each include any of various electronic devices or other data-generating sources (e.g., mobile electronic devices, other computing servers, other applications running in the cloud, sensors, and so forth) that may provide event data streams (e.g., business event data, operations event data, infrastructure metrics event data, human-related event data, administrative event data, productivity event data, maintenance event data, social network data, world-markets event data, stock-market volatility event data, currency rate event data, and so forth) to the streaming analytics system 108 in real-time or near real-time (e.g., as the events occur) for processing, analysis, and decision-making. In some embodiments, the client devices 102 (e.g., "Client Device 1"), 104 (e.g., "Client Device 2"), and 106 (e.g., "Client Device N") may each respectively correspond to a different cloud-based cluster computing architecture, or, otherwise, may each provide respective event data streams to be coalesced (e.g., joined together and associated each with one another) as part of the processing, analysis, and decision-making performed by the streaming analytics system 108.

For example, in one embodiment, the client device 102 (e.g., "Client Device 1") may be based on an Apache Spark cluster computing architecture, the client device 104 (e.g., "Client Device 2") may be based on an Apache Storm cluster computing architecture, while the client device 106 (e.g., "Client Device N") may be based on an Apache Flink cluster computing architecture. In another embodiment, for example, each respective event data streams (e.g., "Event Stream 1", "Event Stream 2", "Event Stream 3") may be coalesced (e.g., joined together) as part of the processing, analysis, and decision-making performed by the streaming analytics system 108. For example, in the example of web analytics event data streams, the client device 102 (e.g., "Client Device 1") may stream a data event (e.g., "Event Stream 1") representative of an impression event, while, on the other hand, the client device 104 (e.g., "Client Device 2") may stream a data event (e.g., "Event Stream 2") representative of a click event.

In certain embodiments, the streaming analytics system 108 may receive the respective event data streams (e.g., "Event Stream 1", "Event Stream 2", "Event Stream 3") from the client devices 102 (e.g., "Client Device 1"), 104 (e.g., "Client Device 2"), and 106 (e.g., "Client Device N") and perform one or more join operations. The streaming analytics system 108 may then perform a join operation (e.g., coalescing and correlating of the event data streams or the coalescing and correlating of one or more data sets of the respective event data streams) based thereon. For example, referring again to the example of web analytics event data streams, the streaming analytics system 108 may perform a join operation in which, for example, event data of the event data stream (e.g., "Event Stream 1") from the client device 102 (e.g., "Client Device 1") representing the impression event is joined to the event data of the event data stream (e.g., "Event Stream 2") from the client device 104 (e.g., "Event Stream 2") representing the click event. In one or more embodiments, the streaming analytics system 108 may perform the join operation based on, for example, the detection of a correlation key or other similar data correlation mechanism.

In certain embodiments, to perform the aforementioned join operations, as well as other various processing and/or decision-making tasks in response to one or more continuous queries received, as further depicted in FIG. 1, the streaming analytics system 108 may include a number of stream processing devices 122 (e.g., "Stream Processing Device 1"), 124 (e.g., "Stream Processing Device 2"), and 126 (e.g., "Stream Processing Device N"). In some embodiments, the stream processing devices 122 (e.g., "Stream Processing Device 1"), 124 (e.g., "Stream Processing Device 2"), and 126 (e.g., "Stream Processing Device N") may each include, for example, one or more special-purpose processing devices such as an application specific integrated circuit (ASIC), a field programmable gate array (FPGA), a digital signal processor (DSP), network processor, or the like. As illustrated, each of the stream processing devices 122 (e.g., "Stream Processing Device 1"), 124 (e.g., "Stream Processing Device 2"), and 126 (e.g., "Stream Processing Device N") may correspond to a respective one of the client devices 102 (e.g., "Client Device 1"), 104 (e.g., "Client Device 2"), and 106 (e.g., "Client Device N"). In one embodiment, each stream processing devices 122 (e.g., "Stream Processing Device 1"), 124 (e.g., "Stream Processing Device 2"), and 126 (e.g., "Stream Processing Device N") may process a respective event data stream (e.g., "Event Stream 1", "Event Stream 2", "Event Stream 3"). In other embodiments, the event data streams (e.g., "Event Stream 1", "Event Stream 2", "Event Stream N") may each be received and process by any of the stream processing devices 122 (e.g., "Stream Processing Device 1"), 124 (e.g., "Stream Processing Device 2"), and 126 (e.g., "Stream Processing Device N").

For example, in some embodiments, the stream processing devices 122 (e.g., "Stream Processing Device 1"), 124 (e.g., "Stream Processing Device 2"), and 126 (e.g., "Stream Processing Device N") of the streaming analytics system 108 may be programmed to collectively process (e.g., serially or in parallel) the event data streams (e.g., "Event Stream 1", "Event Stream 2", "Event Stream 3") and perform one or more join operations of the event data of the event data streams within one or more precise time intervals (e.g., over a course of seconds, over a course of minutes, or over the course of one or more hours), such that the join operation is valid within the defined time interval and invalid outside of the defined time interval. In this way, the stream processing devices 122 (e.g., "Stream Processing Device 1"), 124 (e.g., "Stream Processing Device 2"), and 126 (e.g., "Stream Processing Device N") may allow for event data (e.g., "Event Stream 2") arriving later than, for example, the event data (e.g., "Event Stream 2") to be joined therewith.

As further depicted, in some embodiments, the streaming analytics system 108 may also include storage 128 and a network interface 130. The network interface 130 may be used to operatively couple (e.g., wired or wireless) the streaming analytics system 108 to, for example, the client devices 102 (e.g., "Client Device 1"), 104 (e.g., "Client Device 2"), and 106 (e.g., "Client Device N"), the resource databases 110, 112, and 114, and/or other devices or systems that may be included within the data analytics event processing architecture 100. The storage 128 may include one or more memory devices (e.g., distributed cache memory or other volatile, short-term storage) that may be used by each of the stream processing devices 122 (e.g., "Stream Processing Device 1"), 124 (e.g., "Stream Processing Device 2"), and 126 (e.g., "Stream Processing Device N") to, at least in some embodiments, selectively and temporarily store one or more instances of the respective event data streams (e.g., "Event Stream 1", "Event Stream 2", "Event Stream 3").

In one embodiment, the storage 128 may be configured to hold the respective event data streams (e.g., "Event Stream 1", "Event Stream 2", "Event Stream 3") for a user-configurable or service-configurable time period (e.g., from 1 second up to 500 seconds, or from 1 minute up to 500 minutes). As will be further appreciated with respect to FIGS. 2-4, in certain embodiments, the storage 128 may include distributed cache memory that may be used to selectively store the data from each of the event data stream (e.g., "Event Stream 1", "Event Stream 2", "Event Stream 3") generated by the client devices 102 (e.g., "Client Device 1"), 104 (e.g., "Client Device 2"), and 106 (e.g., "Client Device N") into distributed cache memory as a technique to reduce overall memory capacity (e.g., nonvolatile memory or long-term storage) while one or more join operations are being performed by either of the stream processing devices 122 (e.g., "Stream Processing Device 1"), 124 (e.g., "Stream Processing Device 2"), and 126 (e.g., "Stream Processing Device N").

As further illustrated by FIG. 1, following the processing, analysis, and decision-making performed by the streaming analytics system 108, the streaming analytics system 108 may transmit outputs including one or more sets of data results and/or solutions to received queries to be stored, for example, by the resource databases 110, 112, and 114 (e.g., nonvolatile memory or long-term storage). The one or more sets of data results and/or solutions to received queries stored by the resource databases 110, 112, and 114 may then be accessible by one or more clients (e.g., users, developers, managers, operators, customers, and so forth) via the business intelligence (BI) applications 116 (e.g., business services analytics applications), custom applications 118 (e.g., user-customizable or customer-specific data analytics applications), and other applications 120 (e.g., operational analytics applications, visualization analytics applications, and so forth). In other embodiments, the one or more sets of data results and/or solutions to received queries may be published to, for example, one or more additional event data streams.

As previously noted, certain data streaming analytics systems such as, for example, Apache Spark, Apache Storm, Apache Flink, may precipitate a number of challenges or other inefficiencies when attempting to perform join operations (e.g., coalescing and correlating of the event data streams or the coalescing and correlating of one or more data sets of the respective event data streams) of two or more event data streams. For example, as discussed above, such data streaming analytics systems may include one or more applications to define a specific time interval (e.g. a fixed time window) in which the join operation is to be completed. Specifically, such data streaming analytics systems may define the specific time interval (e.g., fixed time interval) in an effort to limit the amount of data required to be held in memory where the join operation is to occur.

For example, in one embodiment, once the first event data stream arrives at the data streaming analytics system, the first event data stream is stored in memory and the fixed time window commences. Yet, if the second event data stream does not arrive at the data streaming analytics system before the fixed time window expires, and, by extension, the join operation is not completed before the fixed time interval expires, the first event data stream may be deleted from memory to preserve memory capacity. Thus, by instituting a fixed time window in which the join operation is to be completed to preserve memory capacity, such data streaming analytics systems may precipitate an inevitable trade-off between the length of time the data streaming analytics system may allow for the join operation to be performed and the memory capacity required to hold the first event data stream over the fixed time window, for example. This may lead to various inefficiencies, such as the loss of important data or the failure of certain join operations to be performed (e.g., such as when the join operation takes longer to complete than the allotted time window allows).

Figure 2:
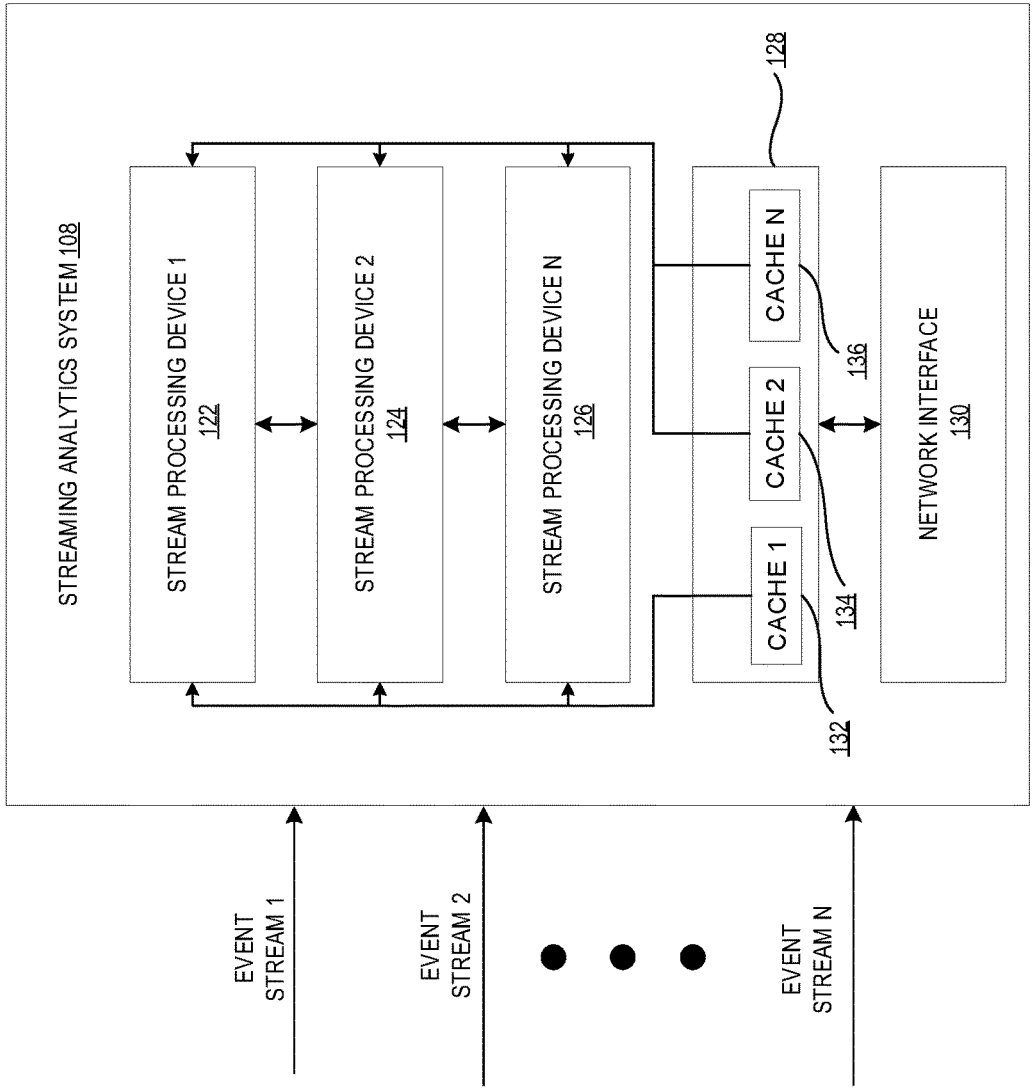
FIG. 2 is a block diagram illustrating an example the streaming analytics system including distributed cache memory, in accordance with the present embodiments.
Figure 3:
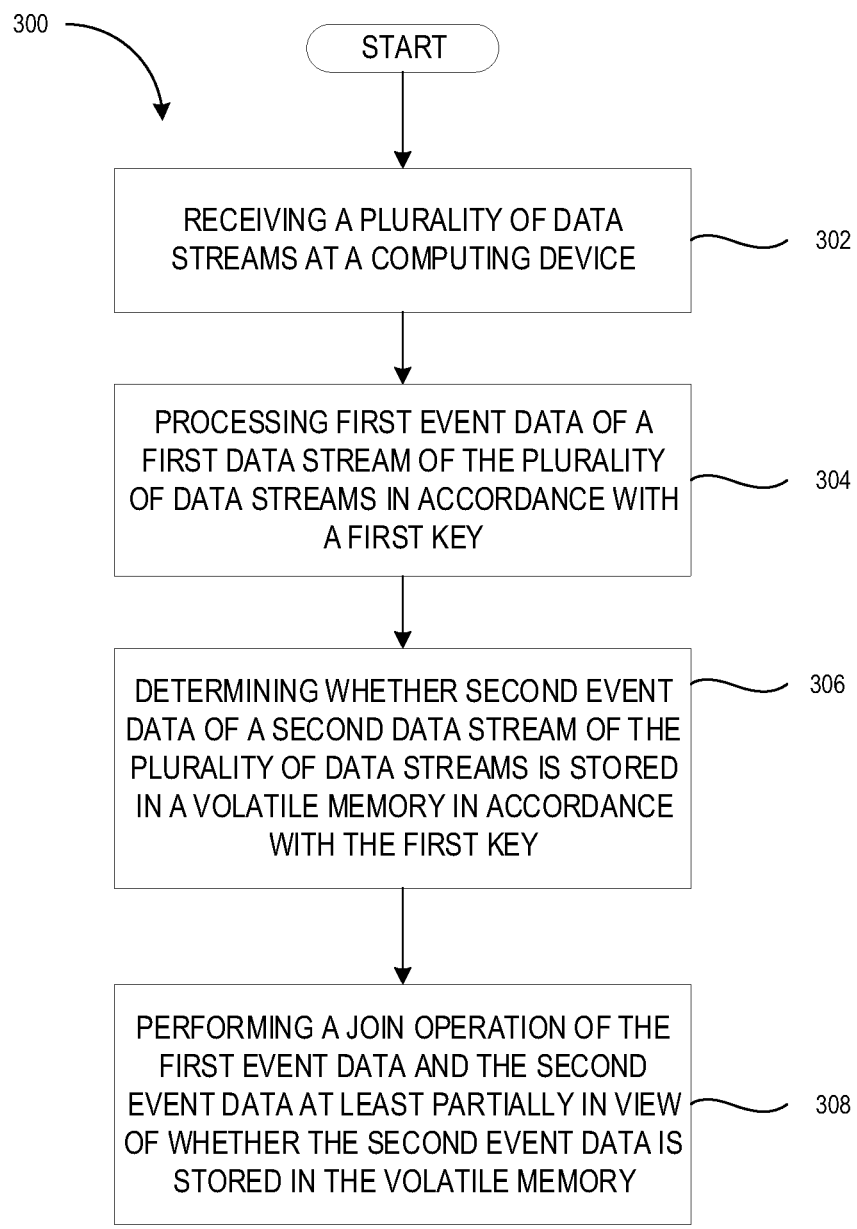
FIG. 3 is a flow diagram of a method of joining a plurality of event data streams, in accordance with some embodiments of the present disclosure.
Figure 4:
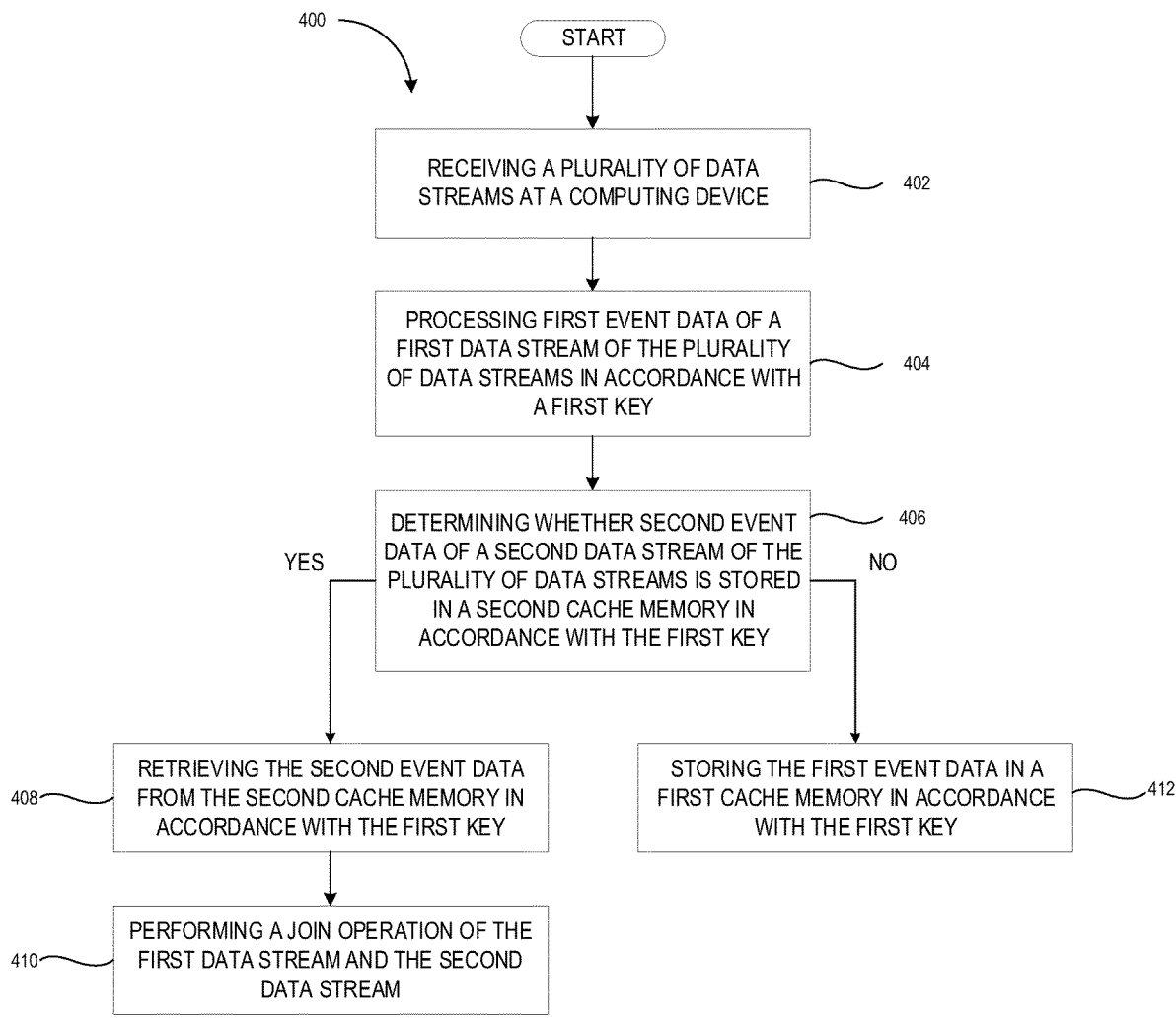
FIG. 4 is a flow diagram of another method of joining a plurality of event data streams, in accordance with the present embodiments.

Accordingly, in certain embodiments, as illustrated with respect to FIGS. 2-4, it may be useful to provide a streaming analytics system 108 and the storage 128 in which distributed cache memory 132 (e.g., "Cache 1"), 134 (e.g., "Cache 2"), and 136 (e.g., "Cache N") that may be used to selectively and temporarily store the data from each of the event data streams (e.g., "Event Stream 1", "Event Stream 2", "Event Stream 3") generated by the client devices 102 (e.g., "Client Device 1"), 104 (e.g., "Client Device 2"), and 106 (e.g., "Client Device N") into distributed cache memory. In certain embodiments, the distributed cache memory 132 (e.g., "Cache 1"), 134 (e.g., "Cache 2"), and 136 (e.g., "Cache N") may generally include any of various distributed cache memory, such as Terracotta, Ehcache, Hazelcast, Memcached, Redis, Cassandra, and so forth. Indeed, the present techniques may reduce the amount of required overall memory capacity (e.g., nonvolatile memory or long-term storage) while one or more join operations are being performed by either of the stream processing devices 122 (e.g., "Stream Processing Device 1"), 124 (e.g., "Stream Processing Device 2"), and 126 (e.g., "Stream Processing Device N"). In this way, by offloading the storage of the event data streams to the cache memory 132, 134, and 136 (e.g., as opposed to the resource databases 110, 112, and 112 or other nonvolatile or long-term storage) and utilizing the cache memory 132, 134, and 136 to perform the join operations, the present techniques may increase efficiency in performing join operations since the dependence on memory capacity (e.g., nonvolatile memory or other long-term storage) is removed.

Referring to FIG. 2, during operation in which a join is to be performed between, for example, a first event data stream (e.g., "Event Stream 1") and a second event data stream (e.g., "Event Stream 2"), the stream processing device 122 (e.g., "Stream Processing Device 1") may receive the first event data stream (e.g., "Event Stream 1"). While the present example may be discussed with respect to, for example, the stream processing device 122 (e.g., "Stream Processing Device 1") and/or the stream processing device 124 (e.g., "Stream Processing Device 2"), it should be appreciated that either of the stream processing devices 122, 124, and 126 may perform one or more join operations (singularly or collectively in some embodiments). After receiving event data of the first event data stream (e.g., "Event Stream 1"), the stream processing device 122 (e.g., "Stream Processing Device 1") may then process the event data of the first event data stream (e.g., "Event Stream 1") and read a correlation key (e.g., or other similar data correlation mechanism) associated with the event data of the first event data stream (e.g., "Event Stream 1").

In certain embodiments, the stream processing device 122 (e.g., "Stream Processing Device 1") may then access the other cache memory 134 (e.g., "Cache 2") to determine whether the event data of the second event data stream (e.g., "Event Stream 2") is stored therein. In some embodiments, the stream processing device 122 (e.g., "Stream Processing Device 1") may determine whether the event data of the second event data stream (e.g., "Event Stream 2") is stored in one of the cache memory 132 and 134 by parsing for other event data being associated with the same correlation key (e.g., or other similar data correlation mechanism) as the event data of the first event data stream (e.g., "Event Stream 1"). If the stream processing device 122 (e.g., "Stream Processing Device 1") determines that the event data of the second event data stream (e.g., "Event Stream 2") associated with the same correlation key is located in either of the cache memory 132 and 134, the stream processing device 122 (e.g., "Stream Processing Device 1") may retrieve that event data of the second event data stream (e.g., "Event Stream 2") and perform the join operation between the event data of the first event data stream (e.g., "Event Stream 1") and the event data of the second event data stream (e.g., "Event Stream 2"). Upon the completion of the join operation, the stream processing device 122 (e.g., "Stream Processing Device 1") may then remove (e.g., by deleting or destroying) all the event data associated with the correlation key stored by the cache memory 132 and 134.

On the other hand, if the stream processing device 122 (e.g., "Stream Processing Device 1") determines that the event data of the second event data stream (e.g., "Event Stream 2") associated with the same correlation key is not located in either of the cache memory 132 and 134, the stream processing device 122 (e.g., "Stream Processing Device 1") may store the event data of the first event data stream (e.g., "Event Stream 1") and the associated correlation key in the cache memory 132 (e.g., "Cache 1") and wait for the event data of the second event data stream (e.g., "Event Stream 2") associated with the same correlation key to arrive at the stream processing device 124 (e.g., "Stream Processing Device 2"). Thus, the present techniques account for the case in which the stream processing device 124 (e.g., "Stream Processing Device 2") may store the event data of the second event data stream (e.g., "Event Stream 2") in the cache memory 134 (e.g., the cache memory corresponding to the stream processing device 124 and designated to store the event data of the second event data stream), or vice versa when the event data of the second event data stream (e.g., "Event Stream 2") arrives at the stream processing device 124 (e.g., "Stream Processing Device 2") before the event data of the first event data stream (e.g., "Event Stream 1") arrives at the stream processing device 122 (e.g., "Stream Processing Device 1").

In this way, the event data of the second event data stream (e.g., "Event Stream 2") associated with the same correlation key may be available at the point in time in which the stream processing device 122 (e.g., "Stream Processing Device 1") attempts to retrieve the event data of the second event data stream (e.g., "Event Stream 2") (e.g., as opposed to having been possibly deleted to preserve memory capacity). In other words, the present techniques are not limited by memory capacity required to hold event data of an event data stream over a fixed time window, since each of the stream processing devices 122 (e.g., "Stream Processing Device 1"), 124 (e.g., "Stream Processing Device 2"), and 126 (e.g., "Stream Processing Device N") utilizes its corresponding cache memory 132 (e.g., "Cache 1"), 134 (e.g., "Cache 2"), and 136 (e.g., "Cache N") to store event data and perform one or more join operations.

It should be appreciated that the forgoing techniques compensate for a case in which either of the stream processing devices 122 (e.g., "Stream Processing Device 1"), 124 (e.g., "Stream Processing Device 2"), and 126 (e.g., "Stream Processing Device N") stores the event data in the corresponding respective cache memory 132 (e.g., "Cache 1"), 134 (e.g., "Cache 2"), and 136 (e.g., "Cache N"), such that the event data is available for retrieval at the time of initial processing.

In another embodiment, such as, for example, in certain particular clustered environments in which distribution of cache event data includes some delay, there may be a small time window in which the stream processing devices 122 (e.g., "Stream Processing Device 1") and 124 (e.g., "Stream Processing Device 2"), for example, may not detect the event data inside the other stream processing devices corresponding cache memory 132 (e.g., "Cache 1") and 134 (e.g., "Cache 2"). This may lead to the stream processing devices 122 (e.g., "Stream Processing Device 1") and 124 (e.g., "Stream Processing Device 2"), for example, storing to cache each's own event data and the expected join operation failing to occur.

Accordingly, it may be useful to provide an additional time-window join technique in which a similar processing device may perform an in-memory join operation. For example, the in-memory join operation may include programming the memory to hold the event data for a configurable time interval, which may be referred to herein as a "time-to-live" value. In one embodiment, the "time-to-live" value may be set to approximately 2 times the expected time required to successfully perform and complete a specific join operation. For example, if the expected time to successfully perform and complete a certain join operation is approximately 60 minutes, the "time-to-live" value may be set to approximately 120 minutes. In another embodiment, the "time-to-live" value may be set to correspond to a latency time associated with distributing, for example, cache event data in the particular clustered environment. Thus, the "time-to-live" may allow ample time to successfully perform and complete any join operations before removing (e.g., deleting or destroying) the stored event data.

Turning now to FIG. 3, which illustrates is a flow diagram of a method 300 of joining multiple event data streams in accordance with the present embodiments. The method 300 may be performed by processing logic (e.g., stream processing devices 122, 124, and 126) that may include hardware (e.g., circuitry, dedicated logic, programmable logic, one or more processors, one or more processing devices, a central processing unit (CPU), a system-on-chip (SoC), etc.), software (e.g., instructions running/executing on a processing device), firmware (e.g., microcode), or various combinations thereof.

The method 300 may begin at block 302 with a processing device (e.g., stream processing device 122) receiving a plurality of event data streams (e.g., "Event Stream 1", "Event Stream 2", . . . "Event Stream N") at a computing device (e.g., streaming analytics system 108). The method 300 may continue at block 304 with the processing device (e.g., stream processing device 122) processing event data of a first event data stream (e.g., "Event Stream 1") of the plurality of event data streams in accordance with a first correlation key. The method 300 may then continue at block 306 with the processing device (e.g., stream processing device 122) determining whether event data of a second event data stream (e.g., "Event Stream 2") of the plurality of event data streams is stored in a cache memory (e.g., cache memory 134) in accordance with the first correlation key. The method 300 may then conclude at block 308 with the processing device (e.g., stream processing device 122) performing a join operation of the event data of the first event data stream (e.g., "Event Stream 1") and the event data of the second event data stream (e.g., "Event Stream 2") at least partially in view of whether the event data of the second event data stream (e.g., "Event Stream 2") is stored in the volatile memory (e.g., cache memory 134) in accordance with the first correlation key.

Turning now to FIG. 4, which illustrates is another flow diagram of a method 400 of joining multiple event data streams in accordance with the present embodiments. As noted above with respect to the method 300 of FIG. 3, the method 400 may also be performed by processing logic (e.g., stream processing devices 122, 124, and 126) that may include hardware (e.g., circuitry, dedicated logic, programmable logic, one or more processors, one or more processing devices, a central processing unit (CPU), a system-on-chip (SoC), etc.), software (e.g., instructions running/executing on a processing device), firmware (e.g., microcode), or various combinations thereof.

The method 400 may begin at block 402 with a processing device (e.g., stream processing device 122) receiving a plurality of event data streams (e.g., "Event Stream 1", "Event Stream 2", . . . "Event Stream N") at a computing device (e.g., streaming analytics system 108). The method 400 may continue at block 404 with the processing device (e.g., stream processing device 122) processing event data of a first event data stream (e.g., "Event Stream 1") of the plurality of event data streams in accordance with a first correlation key. The method 400 may then continue at block 406 with the processing device (e.g., stream processing device 122) determining whether second event data of a second event data stream (e.g., "Event Stream 2") of the plurality of event data streams is stored in a second volatile memory (e.g., cache memory 134) in accordance with the first correlation key.

If the processing device (e.g., stream processing 122) determines that the second event data is stored in the second volatile memory (e.g., cache memory 134) in accordance with the first correlation key, the method 400 may then continue at block 408 with the processing device (e.g., stream processing device 122) retrieving the second event data from the second volatile memory (e.g., cache memory 134) in accordance with the first correlation key. The method 400 may then continue at block 410 with the processing device (e.g., stream processing device 122) performing a join operation of the first event data and the second event data.

On the other hand, if the processing device (e.g., stream processing device 122) determines that the second event data is not stored in the second volatile memory (e.g., cache memory 134) in accordance with the first correlation key, the method 400 may then continue at block 412 with the processing device (e.g., stream processing device 122) storing the first data event stream in a first volatile memory (e.g., cache memory 132) in accordance with the first correlation key.

Figure 5:
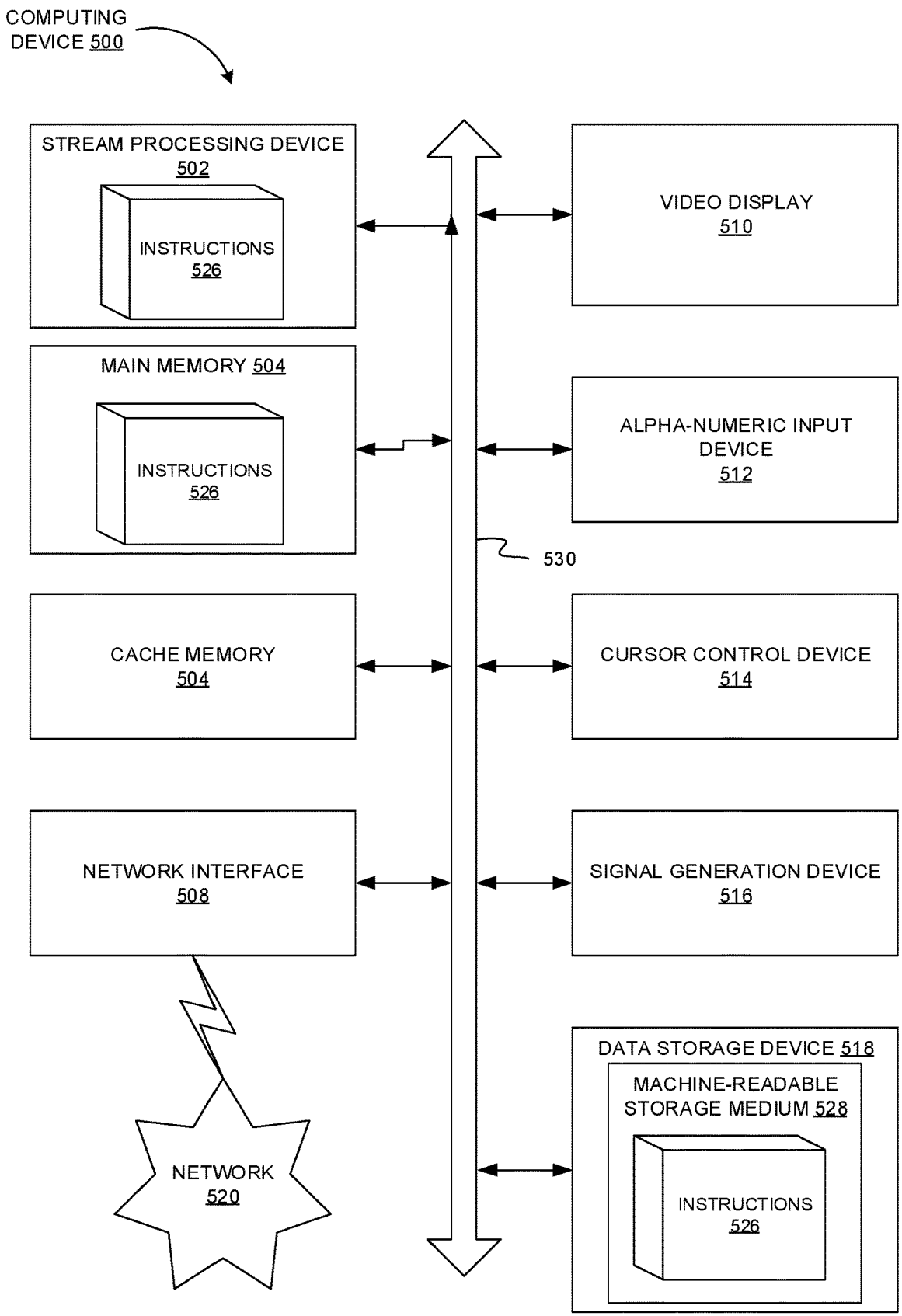
FIG. 5 is a block diagram of an example computing device that may perform one or more of the operations described herein, in accordance with the present embodiments.

FIG. 5 is a block diagram of an example computing device 500 that may perform one or more of the operations described herein, in accordance with some embodiments. The computing device 500 may be connected to other computing devices in a LAN, an intranet, an extranet, and/or the Internet. The computing device 500 may operate in the capacity of a server machine in client-server network environment or in the capacity of a client in a peer-to-peer network environment. The computing device 500 may be provided by a personal computer (PC), a set-top box (STB), a server, a network router, switch or bridge, or any machine capable of executing a set of instructions (sequential or otherwise) that specify actions to be taken by that machine. Further, while only a single computing device 500 is illustrated, the term "computing device" shall also be taken to include any collection of computing devices that individually or jointly execute a set (or multiple sets) of instructions to perform the methods discussed herein.

The example computing device 500 may include a stream processing device (e.g., a general purpose processor, a PLD, etc.) 502, a cache memory 504 (e.g., volatile memory or other similar short-term storage), a static memory 506 (e.g., flash memory and a data storage device 518), which may communicate with each other via a bus 530.

The stream processing device 502 may be provided by one or more general-purpose processing devices such as a microprocessor, central processing unit, or the like. In an illustrative example, stream processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The stream processing device 502 may also comprise one or more special-purpose processing devices such as an application specific integrated circuit (ASIC), a field programmable gate array (FPGA), a digital signal processor (DSP), network processor, or the like. The stream processing device 502 may be configured to execute the operations described herein, in accordance with one or more aspects of the present disclosure, for performing the operations and steps discussed herein.

The computing device 500 may further include a network interface 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

The data storage device 518 may include a computer-readable storage medium 528 on which may be stored one or more sets of instructions, e.g., instructions for carrying out the operations described herein, in accordance with one or more aspects of the present disclosure. Instructions implementing module 526 may also reside, completely or at least partially, within cache memory 504 and/or within stream processing device 502 during execution thereof by the computing device 500, cache memory 504 and stream processing device 502 also constituting computer-readable media. The instructions may further be transmitted or received over a network 520 via network interface 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Figure 6:
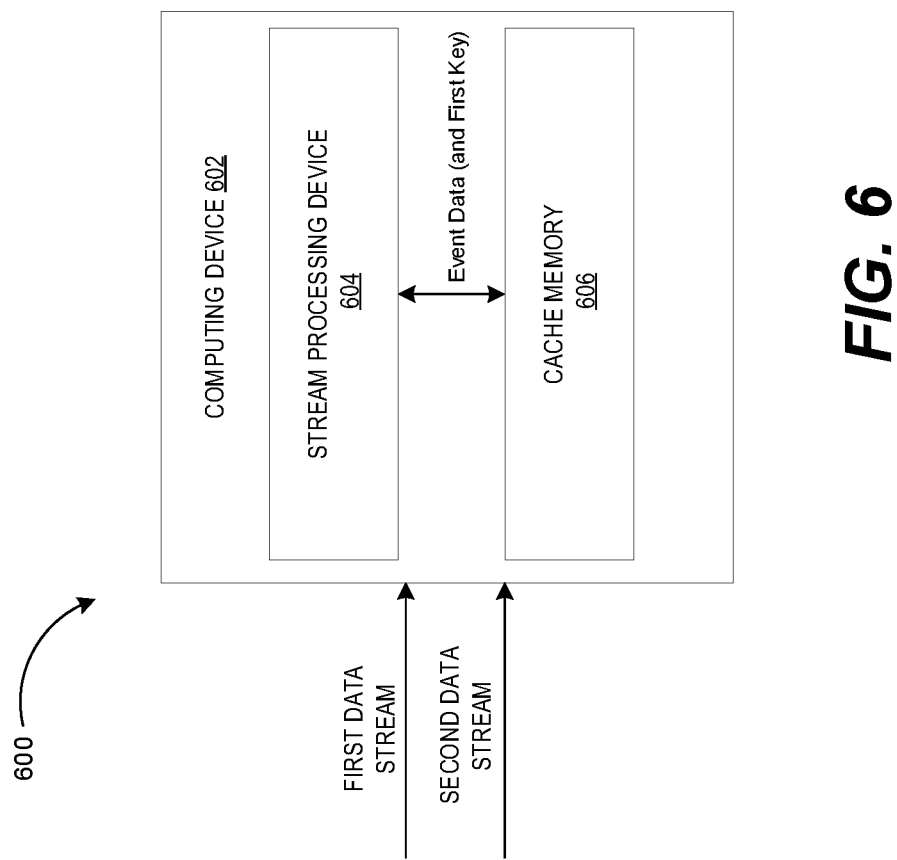
FIG. 6 is a block diagram of an example apparatus that may perform one or more of the operations described herein, in accordance with some embodiments.

FIG. 6 illustrates an apparatus 600. As depicted, the apparatus 600 may include a computing device 602, which may be used to receive and analyze a number of data streams (e.g., "First Data Stream", "Second Data Stream"). As further depicted, the computing device 602 may include a stream processing device 604 and a volatile memory 606. During operation, the stream processing device 604 may process first event data of a first data stream (e.g., "First Data Stream") of the number of data streams in accordance with a first key. The stream processing device 604 may then determine whether second event data of a second data stream (e.g., "Second Data Stream") of the number of data streams is stored in the volatile memory 606 of the computing device 600 in accordance with the first key in an effort to perform a join operation of the first event data and the second event data. If the second event data is stored in the volatile memory 606 in accordance with the first key, the stream processing device 604 may retrieve the second event data from the volatile memory 606 and perform a join operation of the first event data and the second event data.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the embodiments are not to be limited to the details given herein, but may be modified within the scope and equivalents of the appended claims.

What is claimed is:

1. A method, comprising:
receiving a plurality of data streams at a computing device;
processing, by a first stream processing device, first event data of a first data stream of the plurality of data streams in accordance with a first key, wherein a first cache memory is associated with the first stream processing device to store event data of the first data stream;
determining, by the first stream processing device, whether second event data of a second data stream of the plurality of data streams is stored in a second cache memory associated with a second stream processing device in accordance with the first key, the second event data to be joined with the first event data, wherein the second cache memory is to store event data of the second data stream; and
performing, by the first stream processing device, a join operation of the first event data and the second event data stream at least partially in view of whether the second event data is stored in the second cache memory.

2. The method of claim 1, wherein receiving the plurality of data streams at the computing device comprises receiving a plurality of analytics events each from a respective client device.

3. The method of claim 1, wherein processing the first event data of the first data stream comprises processing the first event data via a first stream processing device of a plurality of stream processing devices of the computing device.

4. The method of claim 3, comprising processing the second event data of the second data stream via a second stream processing device of the plurality of stream processing devices of the computing device.

5. The method of claim 1, wherein determining whether the second event data of the second data stream is stored in the cache memory in accordance with the first key comprises determining whether the second event data is stored in distributed cache memory.

6. The method of claim 1, wherein performing the join operation of the first event data and the second event data comprises performing the join operation at least partially in view of the first key.

7. The method of claim 1, wherein, when the second event data is determined to be stored in the cache memory, the method further comprising:
retrieving the second event data from the cache memory in accordance with the first key; and
performing the join operation of the first event data and the second event data at least partially in view of the first key.

8. The method of claim 1, wherein, when the second event data is determined not to be stored in the cache memory, further comprising:
storing the first event data in a second cache memory in accordance with the first key.

9. The method of claim 1, comprising performing the join operation within a time interval corresponding to a latency associated with the cache memory, the cache memory including distributed cache memory.

10. An apparatus, comprising:
a cache memory; and
a first stream processing device operatively coupled to the cache memory, the first stream processing device to:
receive a plurality of data streams at a computing device;
process first event data of a first data stream of the plurality of data streams in accordance with a first key, wherein a first cache memory is associated with the first stream processing device to store event data of the first data stream;
determine whether second event data of a second data stream of the plurality of data streams is stored in the second cache memory in accordance with the first key, the second event data to be joined with the first event data, wherein the second cache memory is associated with a second stream processing device and the second cache memory is to store event data of the second data stream; and
perform a join operation of the first event data and the second event data at least partially in view of whether the second event data is stored in the second cache memory.

11. The apparatus of claim 10, wherein the stream processing device is to determine whether the second event data of the second data stream is stored in the cache memory by determining whether the second event data is stored in distributed cache memory.

12. apparatus of claim 10, wherein the stream processing device is to perform the join operation of the first event data and the second event data by performing the join operation at least partially in view of the first key.

13. The apparatus of claim 10, wherein, when the second event data is determined to be stored in the cache memory, the stream processing device is to:
retrieve the second event data from the cache memory in accordance with the first key; and
perform the join operation of the first event data and the second event data at least partially in view of the first key.

14. The apparatus of claim 10, wherein, when the second event data is determined not to be stored in the cache memory, the stream processing device is to:
store the first event data in a second cache memory in accordance with the first key.

15. The apparatus of claim 10, wherein the stream processing device is to perform the join operation within a time interval corresponding to a latency associated with the cache memory, the cache memory including distributed cache memory.

16. A non-transitory computer-readable storage medium including instructions that, when executed by a first stream processing device, cause the first stream processing device to:
receive a plurality of data streams at a computing device;
process first event data of a first data stream of the plurality of data streams in accordance with a first correlation key, wherein a first cache memory is associated with the first stream processing device to store event data of the first data stream;
determine whether second event data of a second data stream of the plurality of data streams is stored in a second cache memory associated with a second stream processing device in accordance with the first correlation key, the second event data to be joined with the first event data, wherein the second cache memory is to store event data of the second data stream;
retrieve the second event data from the second cache memory when the second event data is determined to be stored in the second cache memory in accordance with the first correlation key; and perform a join operation of the first event data and the second event data at least partially in view of the first correlation key.

17. The non-transitory computer-readable storage medium of claim 16, further causing the stream processing device to determine whether the second event data of the second data stream is stored in the first cache memory by parsing the first cache memory for event data associated with the first correlation key.

18. The non-transitory computer-readable storage medium of claim 16, wherein, when the second event data is determined not to be stored in the first cache memory, further causing the stream processing device to:

store the first event data in a second cache memory in accordance with the first correlation key.

19. The non-transitory computer-readable storage medium of claim 16, further causing the stream processing device to remove the second event data from the first cache memory following the join operation of the first event data and the second event data.

20. The non-transitory computer-readable storage medium of claim 16, further causing the stream processing device to determine whether the second event data of the second data stream is stored in the first cache memory by determining whether the second event data is stored in distributed cache memory.

* * * * *